Jan. 25, 1955    R. H. BARKER    2,700,696
ELECTRICAL SIGNALING AND/OR AMPLIFYING SYSTEMS
Filed June 7, 1951    6 Sheets-Sheet 1
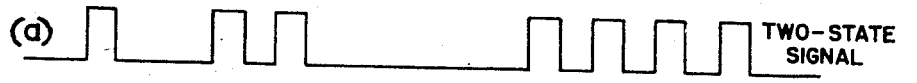
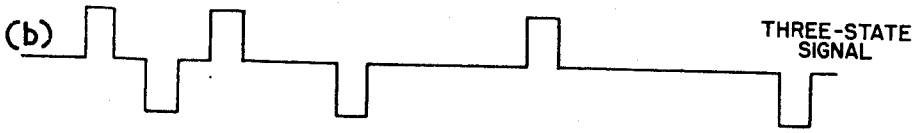
Fig. 1.
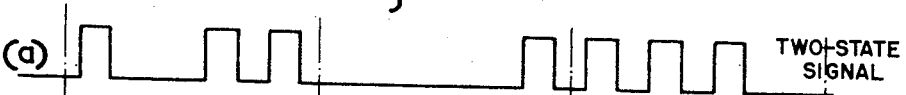
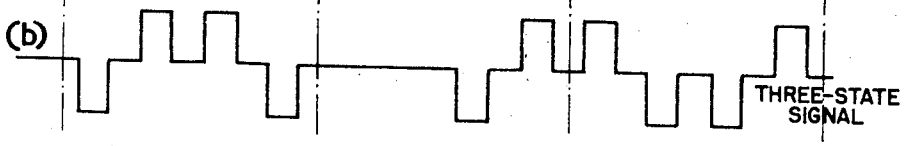
Fig. 2.
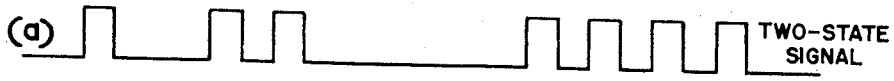
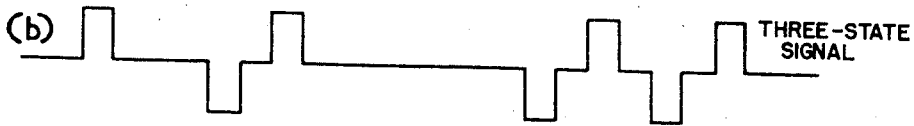
Fig. 3.
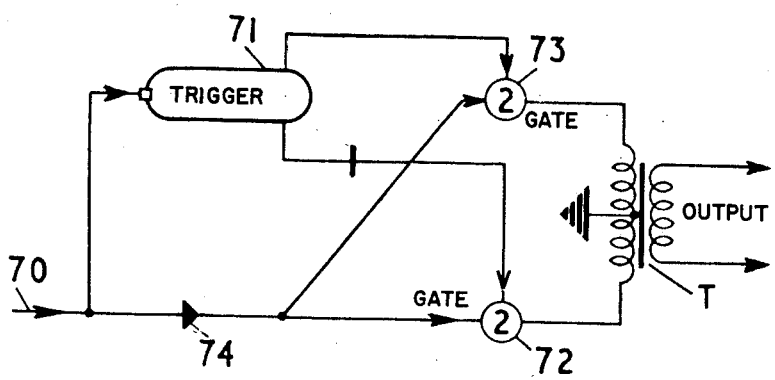
Fig. 7.
Inventor
Ronald Hugh Barker
By
Stevens, Davis, Miller & Mosher
his Attorneys Jan. 25, 1955  R. H. BARKER  2,700,696
ELECTRICAL SIGNALING AND/OR AMPLIFYING SYSTEMS
Filed June 7, 1951                                  6 Sheets—Sheet 2

| SIZE OF GROUP | TWO-STATE SIGNAL COMBINATIONS. | THREE-STATE BALANCED SIGNAL COMBINATIONS. |
|---|---|---|
| ONE. | 1. 1<br>2. 0 | + OR −<br>0 |
| TWO. | 1. 1 1<br>2. 1 0<br>3. 0 1<br>4. 0 0 | + 0 OR − 0<br>+ −<br>− +<br>0 0 |
| THREE. | 1. 1 1 1<br>2. 1 0 1<br>3. 0 1 1<br>4. 1 1 0<br>5. 1 0 0<br>6. 0 1 0<br>7. 0 0 1<br>8. 0 0 0 | 0 + 0 OR 0 − 0<br>+ 0 −<br>− 0 +<br>+ − 0<br>− + 0<br>0 + −<br>0 − +<br>0 0 0 |
| FOUR. | 1. 1 1 1 1<br>2. 1 1 1 0<br>3. 1 1 0 1<br>4. 1 0 1 1<br>5. 0 1 1 1<br>6. 1 1 0 0<br>7. 1 0 0 1<br>8. 1 0 1 0<br>9. 0 1 0 1<br>10. 0 0 1 1<br>11. 0 1 1 0<br>12. 1 0 0 0<br>13. 0 1 0 0<br>14. 0 0 1 0<br>15. 0 0 0 1<br>16. 0 0 0 0<br>17.<br>18.<br>19. | + − + −<br>+ − − +<br>− + − +<br>− + + −<br>+ − 0 0<br>+ 0 − 0<br>0 + − 0<br>0 − + 0<br>0 + 0 −<br>0 0 + −<br>+ 0 0 −<br>− + 0 0<br>0 − 0 +<br>− 0 + 0<br>0 0 − +<br>0 0 0 0<br>− 0 0 +<br>+ + − −<br>− − + + |

Fig.4.

Inventor
Ronald Hugh Barker
By
Stevens, Davis, Miller & Mosher
Attorneys

United States Patent Office 2,700,696
Patented Jan. 25, 1955

2,700,696

ELECTRICAL SIGNALING AND/OR AMPLIFYING SYSTEMS

Ronald Hugh Barker, Christchurch, England, assignor to National Research Development Corporation, London, England, a British corporation Application June 7, 1951, Serial No. 230,287

Claims priority, application Great Britain June 16, 1950

9 Claims. (Cl. 178—2)

The invention is particularly concerned with the transmission and/or amplification of information in an electrical system in which two types of signal are used, a signal of one type representing information of one kind, hereinafter called a "one," and a signal of a second type (or the absence of a signal) representing information of a second kind hereinafter called a "zero." This system will be referred to as a "two-state" system.

A well known example of such a two-state system is to be found in telegraphic signalling where each element may be a mark or a space. A modern development of the technique is to transmit precision data in binary digital form. Such signals are also used in electrical digital computing engines. Each digit on the binary scale may be only one or zero analagous to the mark or space of telegraph signalling. Such data often includes long series of one's or zero's together and a difficulty arises because the large direct current component occurring when a long series of signals of the same type is to be transmitted cannot be transmitted as such over many types of communication or amplifying circuits.

Various modulation systems have been proposed to use for overcoming this difficulty. These systems usually necessitate the use of a carrier and hence double the band-width that would be required if the direct current path were available (except in the case of vestigial side-band transmission).

In addition in amplifying systems for such signals in general direct current coupled amplifiers have been used.

It is an object of the present invention to provide a transmitting and/or amplifying system which overcomes these difficulties wholly or in part.

The invention is carried into practical effect by converting a succession of two-state signals into a succession of three-state signals in which each signal is of one of three types, the first type being a signal of positive polarity, the second type being a zero represented by the absence of a signal and the third type being a signal of negative polarity. The conversion is carried out in such a manner that three-state signals of the first type are substantially balanced by signals of the third type so that the mean value of a succession of about ten signals is zero or almost zero.

It is not necessary for an individual three-state signal of a given type to represent an individual two-state of a given type but the conversion may be such that a group of three-state signals having usually virtually no direct current component is arranged to represent a group of the same number of two-state signals. Due to the greater number of combinations of three-state signals over the number of combinations of two-state signal in a group having the same number of signals in each case, it is usually possible to arrange to represent each group of two-state signals by a group of three-state signals which is balanced about the zero value and hence has no direct current component.

According to the present invention therefore, a method of transmitting and/or amplifying a succession of two-state signals comprises the steps of converting the two-state signals into a succession of three-state signals, the conversion being carried out in such a manner that the low frequency end of the bandwidth required for transmission under the same transmitting conditions is raised.

A preferred method according to the present invention comprises the step of transmitting each zero in the two-state system as a zero in a three-state system and the ones in the two-state system alternately as signals of positive polarity and signals of negative polarity in a three-state system.

In order that the invention may be more clearly understood various methods of converting a succession of two-state signals into a succession of three-state signals, and apparatus for effecting the same, will now be described with reference to the accompanying drawings in which:

Figures 1, 2 and 3 show wave forms illustrating three methods of signal conversion according to the present invention.

Figure 4 is a table showing a scheme of conversion of groups of pulses according to the invention.

Figure 7 shows another circuit for effecting conversion according to the present invention.

Figure 5:
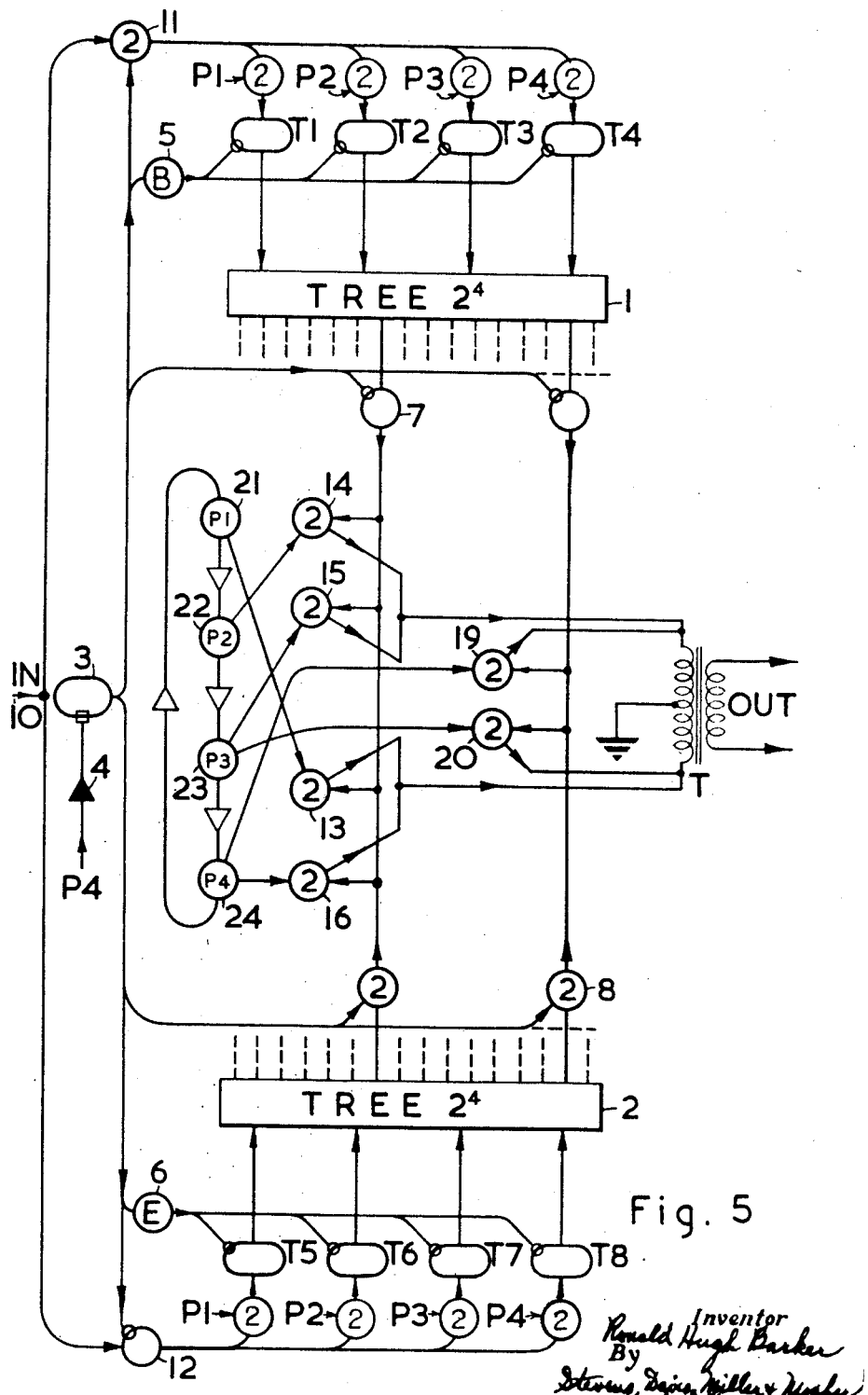
Figure 5 shows a circuit for effecting conversion according to the scheme of Figure 4.
Figure 10:
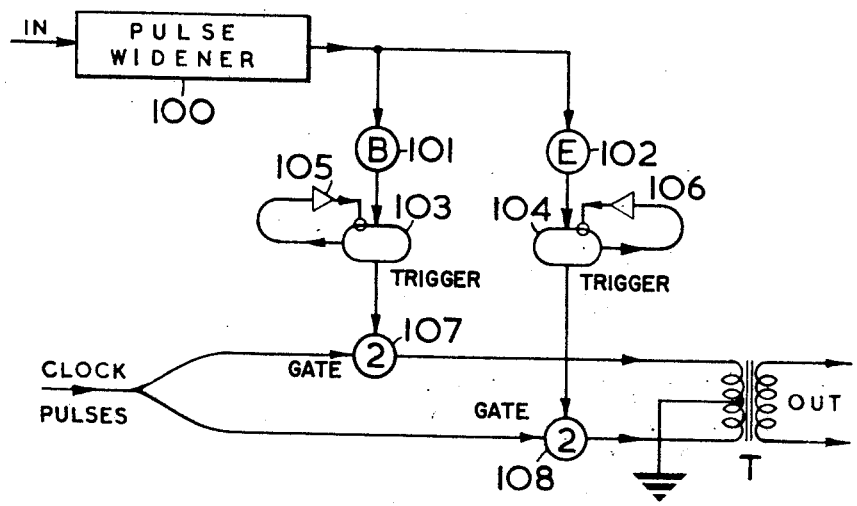
Figure 10 is a circuit for converting signals in the manner described with reference to Figure 1.

In the drawings, especially Figures 5, 7 and 10, the various circuit elements are shown in accordance with a notation known to those skilled in electronics and explained in the specification of U. S. patent application Serial No. 202,615, now Patent No. 2,686,632, issued August 17, 1954.

One particular method of converting the succession of two-state signals into a succession of three-state signals is illustrated by Figure 1. Figure 1(a) shows a succession of two-state signals . . . 101100011110 . . . . Assuming that the signal immediately preceding the first one is a zero, the incidence of this first one causes a signal change in a positive sense and a positive pulse is transmitted as a first type of three-state signal as shown in Figure 1(b). The second two-state signal is a zero and the incidence of this signal causes a signal change in a negative sense and a negative pulse is transmitted as a third type of three-state signal as shown in Figure 1(b). The third two-state signals being a one, a first type of three-state signal is generated as there is a signal change in a positive sense but as the following signal is also a one there is no signal change and a zero is transmitted as a second type of three-state signal as shown in Figure 1(b).

The remainder of the succession of two-state signals is converted into a succession of three-state signals in a similar manner. It will be observed that during any period, commencing at the end of a two-state signal of a given kind and terminating at the end of any subsequent two-state signal of that kind, equal numbers of positive and negative three-state signals are generated. Thus the overall direct current component of a succession of three-state signals, generated from a succession of two-state signals commencing and terminating at zero level, will be zero.

A circuit for carrying out the method of conversion described with reference to Figure 1 is shown in Figure 10. In this case the input signal pulses are applied to a pulse widener 100 which is adjusted so that two pulses occurring consecutively just coalesce. A suitable widener is described in the specification of U. S. patent application Serial No. 205,005. The pulse widener feeds beginning and end elements 101 and 102 which put on two triggers 103 and 104 respectively. These put themselves off one pulse period after they have gone on via the unit delays 105 and 106. In this way the triggers 103 and 104 gate clock pulses in the required polarity through the gates 107 and 108 to the output transformer T. In practice the end and beginning elements will include differentiating circuits and these may in some cases be given time constants sufficiently long to yield pulses which persist long enough to gate the clock pulses through the gates 107 and 108 without the use of the triggers 103 and 104.

Another method of carrying out signal conversion is to break up the succession of two-state signals into groups of signal elements and encode each group as a group of three-state elements. One manner in which this may be carried out for groups containing from one to four elements is shown in the table Figure 4.

If the groups are only single signals then each group cannot be balanced itself but a good overall degree of balance can be achieved by translating a one as a positive or negative three-state signal alternately. This method will be described in greater detail with reference to the Figure 7 of the drawings.

If the groups comprise two or three signals then all the combinations of two-state signals except one in each case can be represented by a balanced three-state signal. The remaining two-state signals can be represented alternately by each of a pair of three-state signal combination which are balanced when taken together. Although in the one, two and three group systems complete balance is not always achieved within each group, the direct current and low frequency components can be made so small that the low frequency cut off point required for transmission will be definitely higher than if a conversion from the two-state system were not made.

If the groups comprise four or more signals, conversion to a balanced group of a corresponding number of three-state signals is always possible. For example there are 16 and 32 combinations of four and five two-state signals respectively while there are 19 and 51 combinations of balanced four and five three-state signals respectively. Figure 4 shows the 16 two-state signals in a group of four and the 19 balanced three-state signals. It should be noted that while there is no objection to choosing the balanced three-state signal No. 17, signals No. 18 and 19 should not be chosen, because if they are not used there will never be more than two consecutive positive or negative signals. When a succession of signals is encoded in groups of four in this manner, a measure of checking is provided in that any misreading of a single element in a group is made obvious by the fact that there is no corresponding group of two-state signals. Figure 2 illustrates this method of conversion for groups of four pulses. Thus the four pulse groups of two state signals shown at Figure 2(a) may be converted into the four pulse groups of three state signals as shown at Figure 2(b), in each of these last groups the pulses are balanced.

One form of apparatus for encoding a succession of two-state signals into three-state signals in groups of four will now be described with reference to Figure 5.

Figure 6:
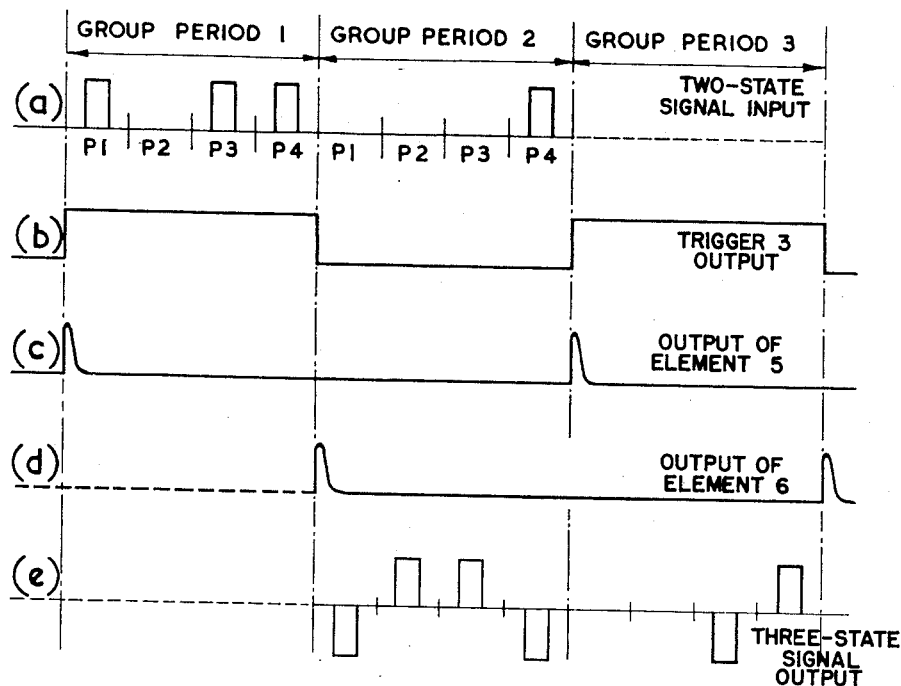
Figure 6 shows waveforms generated in the circuit of Figure 5.

The apparatus includes a first staticisor consisting of four triggers T1 to T4, a first tree circuit 1 of order four, a second staticisor consisting of four triggers T5 to T8 and a second tree circuit 2 of order four. The succession of two-state signals is fed in at 10 and applied to the first and second staticisors during alternate group periods each lasting for four signal elements as illustrated in Figure 6(a). The switching of alternate groups of signals from the first to the second staticisor is carried out by a trigger 3 which controls gates 11 and 12 in the path of signal. The state of the trigger 3 is changed over at the end of each group period so that the gate 11 is open during group periods 1, 3, 5 say, and the gate 12 is open during periods 2, 4, 6 etc.

A ring counter is provided to generate pulses P1, P2, P3 and P4 coincident with the elemental pulse in each group. The four elements of this ring counter are shown diagrammatically at 21, 22, 23 and 24.

It will thus be seen that the state of the trigger 3 is changed over at the beginning of each group period by the application of P4 pulses to its changeover connection through a half unit delay 4.

It will be assumed that it is now the beginning of group period 1 and a succession of two-state signals 1011, 0001, . . . as shown in Figure 6(a) are about to be fed in at 10. It will also be assumed that the trigger 3 output voltage waveform is as shown in Figure 6(b) and hence the output from a beginning element 5 and an end element 6 is as shown in Figures 6(c) and 6(d) respectively. At the beginning of group period 1, therefore, the triggers T1 to T4 are reset by the action of the beginning element 5, the gate 11 is opened and the gate 12 is closed. The first group of four signals 1011 is then staticised on the triggers T1 to T4 and the tree 1 is thereupon set up and an output is produced on the lead to the gate 7, say, and remains there until the triggers T1 to T4 are reset at the beginning of group period 3.

At the end of group period 1 the gate 7 is opened, and thereupon gates 13, 14, 15 and 16 are opened for the duration of group period 2, and outputs from selected elements from 21, 22, 23 and 24 are applied to the gates 13, 14, 15 and 16. This selection is carried out in the following manner. The input signal 1011 has selected one output lead out of 16 output leads from the tree 1 and thereby opens the gates 13, 14, 15 and 16. Assuming the signals are to be encoded in accordance with the table given in Figure 4, the output signal must be − + + −. The gates 14 and 15 are arranged to pass the + signals and gates 13 and 16 the − signals and hence the outputs of the P2 and P3 elements are connected separately to the gates 14 and 15 and the outputs of the P1 and P4 elements are connected separately to the gates 13 and 16. The outputs from the gates 13, 14, 15 and 16 are fed to an output transformer T as indicated so that the resulting output from the transformer T is in the required form.

Meanwhile at the beginning of group period 2 a pulse produced by the end element 6 resets the triggers T5 to T8 and during group period 2 the gate 12 is open, the second group of four signals 0001 are set up on the triggers T5 to T8 and the tree 2 is consequently set to produce an output on the lead connected to a gate 8, say. At the beginning of group period 2 the trigger 3 changes over and opens the gate 8 the output from which thereupon opens gates 19 and 20. From the table shown in Figure 4, a group 0001 is required to be encoded into a group 00 − + and as the gate 19 is chosen to pass the + signal, the output from the P4 generator is applied to it, and as the gate 20 is chosen to pass the − signal, the output from the P3 generator is fed to it. The outputs from the gates 19 and 20 are applied to the transformer T in an appropriate manner so that the resulting output from the transformer T is shown in Figure 6(e).

As indicated each set of gates such as 13, 14, 15 and 16 or 19 and 20 can be opened by either tree because the trees are never both operative at the same time. However separate sets of gates are necessary for each combined tree output. For the sake of clarity only two sets out of the possible sixteen are shown in the drawing.

The outputs from the gates are fed to the transformer T, the whole series of connections being such that the output from the transformer T is in the required three-state form.

Of course if gaps between each group of four pulses can be tolerated only one staticisor and tree is necessary but the arrangement shown in Figure 5 allows a continuous transmission to take place although it will be seen (e. g. from Figure 6(e)) that the information is transmitted one group period later than it arrives at the input 10 in Figure 5.

The method of conversion by which each individual two-state signal is converted into a three-state signal will now be described in detail. Each zero in the two-state system becomes a zero in the three-state system while ones become alternately positive or negative signals in the three-state system. Figure 3(a) shows a succession of two-state signals while Figure 3(b) shows the succession of three-state signals obtained by this method of conversion. Whereas it is somewhat uncertain as to whether a given number of successive three-state signals have no direct current component, in practice any substantial number will have virtually no direct current component as the number of positive three-state signals cannot differ by more than one from the number of negative three-state signals.

A measure of checking is available in that a single character misread results in the failure of + signals and − signals to occur alternately.

A general form of apparatus for converting a succession of two-state signals into a succession of three-state signals by this method is shown in Figure 7. The succession of two-state signals is applied at 70 to two gates 72 and 73 and to the change over connection of a trigger 71. Two outputs from the trigger 71 in opposite phases are applied to the gates 72 and 73 so that the succession of two-state signals fed in at 70 are able to pass through only one of the two gates 72 and 73 at any one time.

The inception of a one changes over the trigger 71 so that successive ones are passed through the gates 72 and 73 alternately.

The outputs from the gates are fed to a transformer T in such a manner that they are combined in opposition, and as zero signals cannot pass through the gates 72 and 73, a succession of three-state signals of the desired form is obtained from the transformer T.

In order that the gates 72 and 73 may be conditioned by the trigger 71 in time to pass the applied signal pulse a half unit delay 74 may be included in the circuit.

Figure 8:
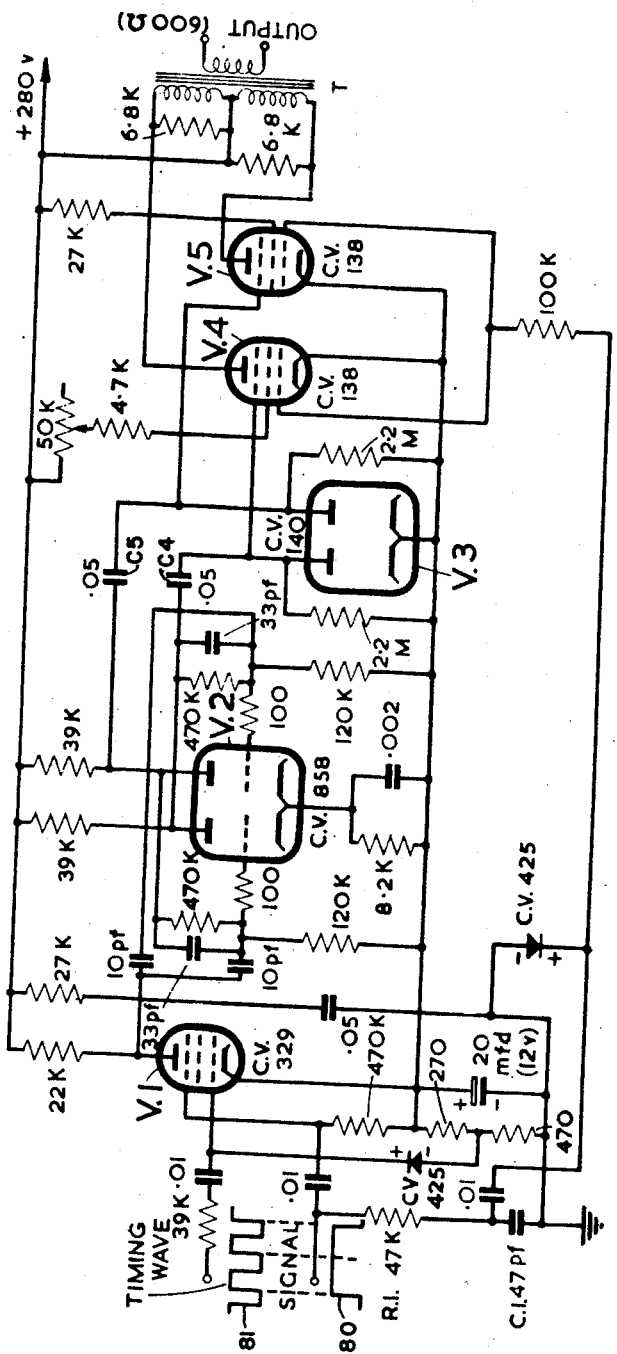
Figure 8 is a detailed circuit of the arrangement shown in Figure 7.

Figure 8 shows in detail a practical circuit of the form shown in Figure 7. Signal pulses which may be coalesced as shown at 80 are applied to the suppressor grid of a pentode valve V1. The operation of this valve is controlled by timing pulses as shown at 81 applied to its control grid so that the valve can conduct only when a timing pulse is applied so that reasonable tolerance in the form of the signal pulses is permitted. The negative-going output pulses which therefore appear on the anode of valve V1 whenever positive-going "one" type signals are applied to its grid are applied to the control grids of a double-triode valve V2 having a common cathode resistor and having its anodes and grids cross connected in a conventional trigger or flip-flop circuit so that one valve, the first valve say, is conducting while the other valve, the second valve say, is cut off. The arrival of a negative-going pulse on the grid of the second triode valve which is cut off has no effect but its arrival on the grid of the conducting first valve reduces the valve current, and its anode potential therefore rises and pulls up the grid of the second valve through their interconnection, so that the second valve starts to conduct. The whole action cumulates rapidly with the result that the trigger flips over and the second valve is rendered fully conducting and the first valve is cut off until the arrival of the next negative-going pulse.

The two anodes of the trigger valve V2 are connected to the suppressor grids of two pentode valves V4 and V5 through 0.05 microfarad capacitors C4 and C5 respectively. Each suppressor grid is connected to earth potential through a separate half of a double diode D. C. restoring valve V3 which prevents the potential applied to the suppressor grids rising above earth potential. Each of the valves V4 and V5 is therefore cut off at its suppressor grid during alternate periods set by the trigger V2.

The original positive signal pulses 80 are applied to the control grids of valves V4 and V5 and the valve whose suppressor grid is at earth potential is rendered conducting during the time a signal is applied. The valves V4 and V5 are connected to the H. T. supply through the two halves of the primary winding of a pulse transformer T. The output is taken from the secondary winding and as successive positive pulses are handled alternately by the valves V4 and V5 which are connected in opposition to the output transformer T, positive input pulses appear alternately positive and negative in the output. An adjustment of the screen potential of one of the valves V4 and V5 is a convenient way of equalizing the pulse amplitudes. The signal pulses are applied to the control grids of the valves V4 and V5 through a slight delay caused by the capacitor C1 and resistor R1 in order that these valves are conditioned by the trigger valve V2 in time to pass the pulses correctly.

Figure 9:
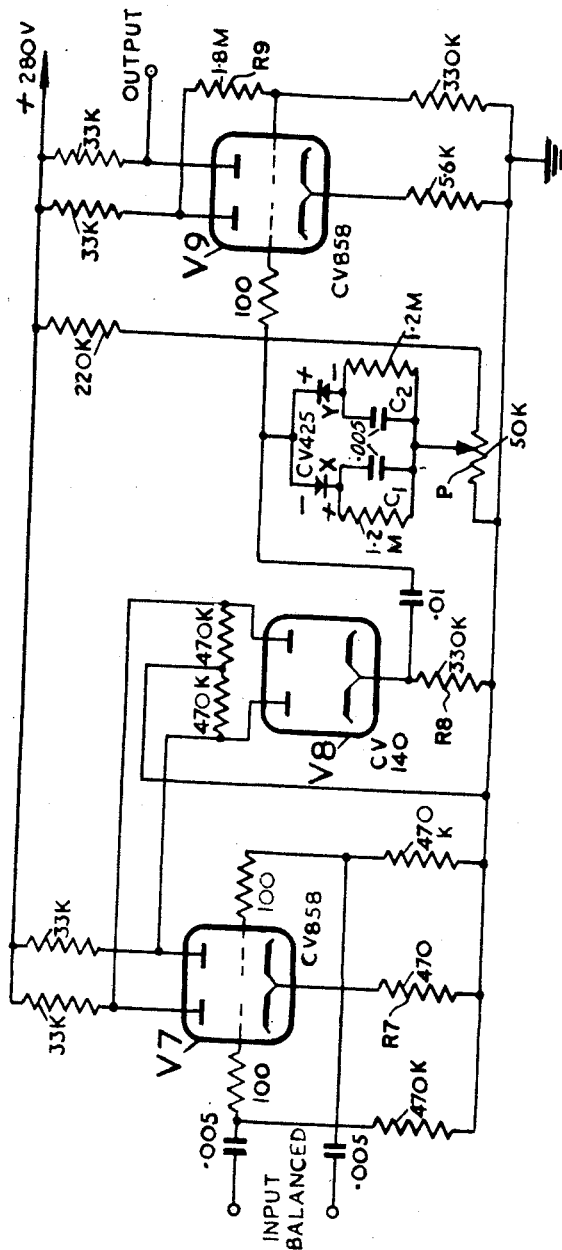
Figure 9 is a circuit for reconverting the signal converted by the circuit shown in Figure 8

Figure 9 shows a circuit for re-converting the three-state signals made by the circuit of Figure 7 or 8 into the original two-state signals. The three-state signals are applied across the two grids of a double triode valve V7 connected as a balanced amplifier. These valves have a common cathode resistor R7 so that when an O type three-state signal occurs and the two grids remain at the same potential the whole double valve conducts and both anode potentials are fairly low. When, however, a + or − three-state signal occurs the grid of one of the triodes of valve V7 will be raised in potential above the other and this valve will take most of the valve current. The potential at the anode of the other valve will be raised as the current flowing through its anode resistor will be reduced.

The potentials on the two anodes of valve V7 are applied to the non-earthed end of a resistor R8 through the separate anodes of a double diode valve V8 which functions in effect as a rectifier. The common cathode potential of diode V8 is that of the more positive of its two anodes so that when an O type three-state signal occurs, the cathode is kept at a fairly low potential, but when either a + or a − three-state signal occurs the potential on one of the two anodes and the cathode potential is pulled up. This potential is applied to the grid of a further double triode valve V9 arranged as the well known Schmitt circuit. The grid of the right-hand valve is maintained at a pre-arranged slicing level by being connected to a resistance chain between the H. T. supply and earth. When the potential on the left-hand grid is driven above this slicing level the left-hand valve takes more current than the right-hand valve and its anode potential falls. The slicing level also tends to fall due to the interconnection R9 and the right-hand valve is practically cut off. A high-level potential therefore appears on the output connection. When the potential applied to the left-hand valve falls below the slicing level the output potential is driven down to a lower level by a similar though reverse process.

The signal potential that appears on the grid of the left-hand valve V9 is made to vary to a substantially equal extent positively and negatively about the slicing level by a network including two capacitors C1 and C2. As the signal level on the cathode of valve V8 varies a charge is built up on these capacitors C1 and C2 until the potential difference between points X and Y is nearly equal to the peak to peak potential difference between the signal levels on the cathode of valve V8. The mean level of the potentials at X and Y is set to the predetermined slicing level by setting a potentiometer P with the result that the signal potential applied to the left-hand grid of valve V9 varies as required. These conditions are maintained independently of amplitude changes and/or changes in the mark-space ratio of the signals within reasonable limits.

What I claim is:

1. Apparatus for converting an electrical signal comprising a first series of pulses of one polarity into a second series of pulses occurring with positive and negative polarity and balanced to produce a zero or reduce direct current component and comprising a staticisor to staticise a group of pulses in the first series, a system of gates, a tree circuit arranged to be set up by the staticisor and to condition said system of gates which are arranged to transmit a predetermined sequence of positive and negative pulses according to the state of the tree circuit.

2. Apparatus according to claim 1 and comprising a further staticisor arranged to staticise groups of pulses in the first series alternately with the other staticisor and a further tree circuit arranged to be set up by the further staticisor and to condition the said system of gates alternately with the other tree circuit.

3. Apparatus according to claim 1 and comprising a trigger arranged to change its state between the occurrence of the groups of pulses and to clear the two staticisors alternately as the trigger is set and re-set to open gates to allow the staticisor to be fed alternately with pulses in the first series and to open gates in the output leads of the two tree circuits alternately.

4. Apparatus for converting a succession of two-state signals into a succession of three-state signals and comprising two gate circuits to which the two-state signals are applied, a binary counter arranged to produce an output which is applied to the gate circuits so that in accordance with the state of the binary counter two-state signals of a one type produce a signal output from one of said gate circuits, while two-state signals of the other type are always blocked by both gate circuits, the succession of two-state signals being applied to the binary counter so that it changes its state on the receipt of each two-state signal of the one type, together with means for combining the outputs from the gate circuits so that they are of opposite polarity, whereby a succession of three-state signals is produced.

5. Apparatus for converting an electrical signal comprising a first series of pulses of one polarity into a second series of pulses occurring alternately as positive and negative pulses and comprising two gates arranged to be fed with the first series of pulses simultaneously and to feed an output circuit with positive and negative pulses respectively, a trigger having a changeover input to which the first series of pulses are applied to change its state on the receipt of each pulse, said trigger being arranged to condition the two gates so that they are open alternately.

6. Apparatus for transmitting a succession of two-state signals comprising means for converting the two-state signals into a succession of three-state signals of one of three types which are a first type of positive polarity, a second type represented by the absence of a signal, and a third type of negative polarity, said third type being of similar amplitude to said first type, including means whereby the conversion of the two-state signals is carried out in such a manner that the number of three-state signals of one polarity in any four or more successive signals does not exceed the number of signals of the opposite polarity by more than two, whereby the low frequency end of the band width required for transmission under the same transmitting conditions is raised.

7. Apparatus for transmitting a succession of two-state signals according to claim 6, including means whereby two-state signals of one type are converted into three-state signals of the first and third type alternately, while two-state signals of the other type are converted into three-state signals of the second type.

8. Apparatus for transmitting a succession of two-state signals according to claim 6, including means whereby successive groups of four or more two-state signals are converted into successive groups of the same number of three-state signals, each group of three-state signals having an equal number of positive and negative polarity signals.

9. Apparatus for transmitting a succession of two-state signals according to claim 6, including means whereby the conversion is such that when one type of two-state signal follows a signal of the other type, a three-state signal of positive polarity is generated, and when a two-state signal of the other type follows a signal of the one type, a three-state signal of negative polarity is generated, while otherwise a three-state signal of the second type is generated.

References Cited in the file of this patent

UNITED STATES PATENTS

| | | |
|---|---|---|
| 1,399,997 | Rainey | Dec. 13, 1921 |
| 2,141,237 | Connery | Dec. 27, 1938 |
| 2,207,743 | Larson et al. | July 16, 1940 |
| 2,459,904 | Watson | Jan. 25, 1949 |
| 2,512,038 | Potts | June 20, 1950 |